United States Patent
Girshovich et al.

(10) Patent No.: US 7,913,569 B2
(45) Date of Patent: Mar. 29, 2011

(54) MAGNETOSTRICTIVE TYPE STRAIN SENSING MEANS AND METHODS

(75) Inventors: Simon Girshovich, Kfar-Saba (IL); Saeid Shammass, Gedera (IL); Uri Sol, Mazkeret Batis (IL)

(73) Assignee: Israel Aerospace Industries Ltd., Lod (IL)

(*) Notice: Subject to any disclaimer, the term of this patent is extended or adjusted under 35 U.S.C. 154(b) by 0 days.

(21) Appl. No.: 12/001,622

(22) Filed: Dec. 11, 2007

(65) Prior Publication Data
US 2009/0145239 A1  Jun. 11, 2009

(51) Int. Cl.
*G01B 7/24* (2006.01)
*G01R 33/18* (2006.01)

(52) U.S. Cl. .......................... 73/779; 324/209
(58) Field of Classification Search ............ 73/779; 324/209
See application file for complete search history.

(56) References Cited

U.S. PATENT DOCUMENTS

| | | | |
|---|---|---|---|
| 3,638,153 A | 1/1972 | Sparrow | |
| 4,697,460 A | 10/1987 | Sugiyama et al. | |
| 4,763,030 A | 8/1988 | Clark et al. | |
| 4,920,806 A | 5/1990 | Obama et al. | |
| 4,938,267 A | 7/1990 | Hasegawa | |
| 5,142,227 A * | 8/1992 | Fish | 324/209 |
| 5,194,806 A | 3/1993 | Obama | |
| 5,347,872 A | 9/1994 | Clark | |
| 5,437,197 A | 8/1995 | Uras et al. | |
| 5,449,418 A | 9/1995 | Tagaki et al. | |
| 5,493,220 A | 2/1996 | Oliver et al. | |
| 5,499,015 A * | 3/1996 | Winkler et al. | 340/572.2 |
| 5,675,252 A | 10/1997 | Podney | |
| 6,622,577 B1 | 9/2003 | Uras | |
| 6,639,402 B2 | 10/2003 | Grimes et al. | |
| 7,093,499 B2 | 8/2006 | Baudendistel | |
| 7,146,866 B2 | 12/2006 | Morelli | |
| 2002/0166382 A1 * | 11/2002 | Bachas et al. | 73/579 |
| 2006/0010963 A1 * | 1/2006 | Bach et al. | 73/54.01 |
| 2007/0034022 A1 * | 2/2007 | Bunyer et al. | 73/862.333 |

FOREIGN PATENT DOCUMENTS

| | | |
|---|---|---|
| EP | 0447044 | 9/1991 |
| JP | 61240132 | 10/1986 |
| JP | 63-202081 | 8/1988 |
| JP | 2004245619 | 9/2009 |

OTHER PUBLICATIONS

G. Ausanio, A.C. Barone, C. Hison, V. Iannotti, G. Mannara, L. Lanotte, "Magnetoelastic sensor application in civil buildings monitoring." Sensors and Actuators A, 123-124, (2005), pp. 290-295.*

(Continued)

*Primary Examiner* — Lisa M Caputo
*Assistant Examiner* — Punam Roy
(74) *Attorney, Agent, or Firm* — Robert G. Lev

(57) ABSTRACT

A strain gauge including: a system including a transmission coil, a magnetostrictive material layer and a receiver coil wherein an alternating transmission signal is applied across the transmission coil and an induced signal is induced in the receiver coil, the intensity of the detected signal across the receiver coil being a measurement of strain, wherein frequency of transmission signal is near to a resonance frequency of the system.

3 Claims, 10 Drawing Sheets

OTHER PUBLICATIONS

A. Ben Amor, T. Budde, H.H. Gatzen, "A magnetoelastic microtransformer-based microstrain gauge." Sensors and Actuators A, 129, (2006) pp. 41-44.*

L. Lanotte, G. Ausanio, C. Hison, V. Iannotti, C. Luponio, "The potentiality of composite elastic magnets as novel materials for sensors and actuators." Sensors and Actuators A, 106, (2003), pp. 56-60.*

K. G. Ong, M. K. Jain, C. Mungle, S. Schmidt, C. A. Grimes, "Magnetism-based Sensors" Complex Mediums II: Beyond Linear Isotropic Dielectrics, Akhlesh Lakhtakia, Werner S. Weiglhofer, Ian J. Hodgkinson, Editors, Proceedings of SPIE vol. 4467 (2001) pp. 158-172.*

* cited by examiner

MAGNETOSTRICTIVE TYPE STRAIN SENSING MEANS AND METHODS

FIELD OF THE INVENTION

The present invention is directed to strain sensors, methods of measuring stress and/or strain with particularly high sensitivity and to applications thereof.

BACKGROUND

The monitoring of mechanical strain in structural members can give advanced warning of failure. Such monitoring is generally performed by strain gauges, which also find application in research and development, maintenance and sometimes failure analysis. In the elastic deformation regime, strain gauges can be used to monitor the elasticity of materials. In the plastic regime, strain gauges can be used for monitoring creep and other phenomena.

A number of strain gauges are commercially available and several others have been proposed over the years. Although strain gauges may be based on widely different physical phenomena, essentially, all strain gauges share a common characteristic in that when undergoing a physical deformation, a measurable change in some easily monitored property is caused. To be useful, very small physical changes are required to produce easily measurable changes in some electrical property such as the electrical resistance. To eliminate aberrations and electrical noise, the change should be orders of magnitude more than changes caused by other factors such as changes in temperature, humidity and the like. Strain gauges are useful to give qualitative information, but require calibration to extract quantifiable information.

Sometimes strain gauges are built into mechanical structures to allow continuous or periodic monitoring. Alternatively, strain gauges are retrofitted to structures by being adhered thereto for testing purposes. Sometimes, strain sensing probes are stuck onto the component to be monitored during a testing session and then removed for subsequent use elsewhere.

Strain gauges may be used for a variety of applications such as monitoring strain in bridges and other buildings, on metal structures such as ships and airplanes and for measuring composite materials; both in research and development and for testing during the lifespan thereof. Strain gauges also find application in the seats of vehicles to detect occupancy for warning regarding seatbelt fastening and airbag activation systems.

Strain gauges utilize some physical phenomenon which results in a significant change of an easily measured property for example, electrical resistance. For example, the resistance of a metallic element varies with its dimensions. If a wire is stretched, the cross section perpendicular to the direction of stretching is decreased and the wire becomes elongated. If resistivity is constant, the change in geometry increases the resistance of the component.

To develop precise and sensitive strain gauges, one is required to monitor a constantly changing physical property that varies measurably with strain, but is negligibly affected by other causes.

Preferably, strain gauges provide instantaneous responses that are easily monitored to give real time data. As will be appreciated, the main design criteria are high sensitivity and reproducibility in the desired strain regime for low cost. Usefully, a strain gauge will be able to monitor both tensile and compressive strains. Some strain gauges are designed to monitor bending strains and torques. By monitoring strains whilst applying varying frequency vibrations and thermal cycling, the service degradation of a material or component can be tracked. Sometimes strain gauges are required to follow high frequency dynamic forces to monitor the effects of vibrations, fatigue, creep, crack propagation and the like. Ideally, strain gauges are stable and give reproducible results over long time periods with negligible temperature drift, large outputting and high noise-resistance.

One known physical property that may be used in strain gauges is the permeability of ferromagnetic materials which assume regions of uniform magnetic polarization known as Weiss domains. In some ferromagnetic materials, the Weiss domains tend to align when the material is strained. This phenomenon is known as the Villari or "reverse magnetostrictive" effect and materials exhibiting the effect are known as magnetostrictive materials. Thus, essentially, a magnetostrictive core exhibiting the Villari effect has magnetic properties that are alterable by application of a strain. A small physical deformation causes a large change in the magnetic properties, particularly the permeability of the magnetostrictive material, and these changes are easily monitored.

For example, U.S. Pat. No. 3,638,153 to Sparrow (Honeywell), the disclosure of which is incorporated herein by reference, describes a transducer having a single layered magnetostrictive member.

U.S. Pat. No. 4,697,460 to Sugiyama et al. (Toyota) titled "Device for measuring torque of a rotary mechanism" describes a torque sensor for electrically detecting torque, such as the torque of an automobile engine, wherein a strain disk is provided in the path of torque transmission and the torque is magnetically detected in terms of the magnetostriction generated in the strain disk. Typically, the magnetostrictive layer is formed by sputtering or by vacuum deposition.

Japanese Patent Publication Number JP2004245619 to Sasaki et al. (Yaskawa Electric Corp) describes a magnetostriction-type distortion sensor that uses a resin containing a soft magnetic powder for connecting a solenoid coil to the circumference of a soft magnetic region.

U.S. Pat. No. 4,920,806 (also European Patent Number EP0329479) to Toshiba, describes a strain gauge that includes a pair of coils printed on one face of a substrate and an amorphous magnetic metallic plate having a magnetostrictive effect arranged on the other face of the substrate. Magnetic flux generated by one of the paired coils passes through the amorphous magnetic metallic plate and links with the other coil. When an object is loaded, resulting in a deformation (strain), the magnetic permeability of the amorphous magnetic metallic plate is changed, due to the magnetostrictive effect, in response to the loading. The density of the magnetic flux passing through the magnetic metallic plate is also changed in response to this changing magnetic permeability and the composite inductance of the paired coils changes in response to the changing density of the magnetic flux. The strain gauge outputs a detection signal which represents the changing density of the magnetic flux, and this signal can be calibrated to measure the load added or the strain caused by the load. The detecting sensitivity of the strain gauge is high. It has high reliability and can be handled with ease. Because the coils are arranged side by side within the probe, the flux linkage is only partial and utilization of the magnetostrictive effect is not optimal.

U.S. Pat. No. 5,437,197 to Uras describes a magnetic sensor comprising an exciter coil and a sensing coil linked by a magnetic flux. U.S. Pat. No. 5,449,418 to Tagaki et al. describes a method of forming a magnetostrictive layer and a strain sensor using same, wherein the amorphous, magnetostrictive material is formed by a high energy beam, such as a laser, for example.

U.S. Pat. No. 5,493,220 to Oliver (Northeastern University) describes a magneto optic stress sensors using the Kerr effect.

U.S. Pat. No. 5,675,252 to Podney (SQM) describes a magnetic and electric field sensor and measurement apparatus comprising a composite structure having alternating secured plural piezoelectric material layers and magnetostrictive material layers, magnets positioned adjacent to the composite structure for supplying a bias field to the composite structure, and a measurement circuit connected to the piezoelectric layers for measuring output of the piezoelectric layers in the composite structure. U.S. Pat. No. 6,622,577 to Uras describes a single coil magnetostrictive force or strain sensor.

U.S. Pat. No. 7,093,499 to Baudendistel (Delphi Technologies) entitled "Force sensor, strain sensor and methods for measuring same" relates to an inductance measuring assembly connected to a coil for measuring the inductance in the coil wherein the measured inductance of the coil changes equally with addition of equal point loads. Specifically, there is described a force sensor comprising: a coil adapted to carry an electric current; a quantum tunneling composite electrically insulated from the coil, disposed in a magnetic path created by the coil when an alternating current is present in the coil, and disposable in a load path of a force to be under strain from the force; and an inductance measuring assembly operatively connected to the coil to measure an inductance in the coil when the alternating current is present in the coil and when the quantum tunneling composite is disposed in the load path of the force to be under strain from the force, wherein the force sensor determines the force using at least the measured inductance in the coil.

U.S. Pat. No. 7,146,866 to Morelli (Delphi Technologies), titled "Magnetostrictive strain sensor and method" describes a magnetostrictive sensor for determining an applied strain that has an in-phase voltage circuit which senses in-phase voltage that is in-phase with an alternating current and which varies correspondingly to a strain on the magnetostrictive core. The magnetostrictive core comprises a magnetostrictive material, such as a nickel-iron alloy, which is able to conduct a magnetic flux and whose permeability is alterable by application of a strain. The suggested material is 50-70% nickel and 30-50% iron. However, other magnetostrictive materials are also suitable, including, but not limited to, nickel, iron, rare earth-iron alloys, and other magnetic materials that exhibit appreciable magnetostrictive coefficients.

A variety of magnetostrictive materials have been employed in sensors. Many of them are deposited by plating techniques. For example: Japanese Patent Number JP632020 titled "Amorphous Magnetic Material By Plating Method" describes an amorphous iron-phosphorus alloy containing 8-23 atomic % phosphorus, deposited as thin films by plating techniques. Similarly, European Patent Number EP0447044 titled "Magneto-elastic film and process" describes a cobalt-iron alloy magneto-elastic film having from about 20 to about 40 atomic weight iron. U.S. Pat. No. 5,194,806 to Obama describes a sensor arrangement that includes a magnetostrictive film of, for example, Co 85% Zr 10% Fe 5%.

Another technique for obtaining an amorphous metal layer is by local melting using a laser, where fast cooling results in the formation of a amorphous metal layer; see for example: U.S. Pat. No. 5,449,418 to Takagi, (Nippondenso Co., Ltd.) titled "Method of formation of magnetostrictive layer and strain sensor using same" which describes a strain sensor for detecting strain in automobiles, robots, and the like, the formation of the magnetostrictive film of which is by forming an alloy film and scanning with overlapping a high energy density beam to form a magnetostrictive layer having an amorphous structure, wherein the resulting magnetostrictive layer has a magnetic inductance in the direction of irradiation that is much higher than in a perpendicular direction thereof. Using such a sensor, it is possible to selectively detect components of stresses and strains in a given direction.

U.S. Pat. No. 5,347,872 titled "Magnetomechanical sensor attachment method" describes a sensor fabricated by bonding a metallic glass ribbon to an object to be measured using a homogeneous viscous organic liquid. A suggested material for the metallic glass ribbon is $Fe_wB_xSi_yC_z$ having the composition: $0.70 \leq w \leq 0.83$, $0.10 \leq x \leq 0.20$, $0.03 \leq y \leq 0.10$, $0 \leq z \leq 0.03$, and $w+x+y+z=1.00$ U.S. Pat. No. 4,938,267 titled "Glassy metal alloys with perminvar characteristics" describes an amorphous cobalt based magnetic alloy—with near zero magnetostriction and perminvar characteristics The glassy alloys have the compositions $Co_aFe_bNi_cM_dB_eSi_f$ where M is at least one member selected from the group consisting of Cr, Mo, Mn and Nb, and "a-f" are in atom percent where "a" ranges from about 66 to 71, "b" ranges from about 2.5 to 4.5, "c" ranges from about 0 to 3, "d" ranges from about 0 to 2 except when M=Mn in which case "d" ranges from about 0 to 4, "e" ranges from about 6 to 24 and "f" ranges from about 0 to 19, with the proviso that the sum of "a", "b" and "c" ranges from about 72 to 76 and the sum of "e" and "f" ranges from about 25 to 27.

U.S. Pat. No. 4,763,030 titled "Magnetomechanical energy conversion" describes a magneto-structure transducer that uses a ribbon element of iron-boron-silicon-carbon metallic glass of the formula $Fe_wB_xSi_yC_z$ wherein $0.78 \leq w \leq 0.83$, $0.13 \leq x \leq 0.17$, $0.03 \leq y \leq 0.07$, $0.005 \leq z \leq 0.03$ and $w+x+y+z=1$. The ribbon is annealed to remove mechanical strains and is then exposed to a magnetic field in the plane of the ribbon and transverse to the long axis of the ribbon. The resulting metallic glass ribbons have very large magnetic coupling coefficients. The treated ribbons are useful in magnetostrictive transducers and in passive listening devices such as hydrophones or pressure sensors.

U.S. Pat. No. 6,639,402 titled "Temperature, stress, and corrosive sensing apparatus utilizing harmonic response of magnetically soft sensor element(s)" to Grimes, relates to a temperature sensing apparatus including a sensor element made of a magnetically soft material operatively arranged within a first and second time-varying interrogation magnetic field, the first time-varying magnetic field being generated at a frequency higher than that for the second magnetic field. A receiver, remote from the sensor element, is engaged to measure the intensity of electromagnetic emissions from the sensor element to identify a relative maximum amplitude value for each of a plurality of higher-order harmonic frequency amplitudes thus measured. A unit then determines a value for temperature (or other parameter of interest) using the relative maximum harmonic amplitude values identified. In other aspects of the invention, the focus is on an apparatus and technique for determining the stress condition value of a solid analyte and for determining a value for corrosion, using the relative maximum harmonic amplitude values identified. A magnetically hard element supporting a biasing field adjacent the magnetically soft sensor element can be included. It will be appreciated however, that the technique of measuring harmonics does not give high sensitivity. Measuring second and higher order harmonics is unduly complicated and sometimes an irreversible response is caused by application of a relatively small load. Of interest, the magnetostrictive materials used were the iron-rich $Fe_{81}B_{13.5}Si_{3.5}C_2$ (METGLAS®

2605SC) and $Fe_{40}Ni_{38}Mo_4B_{18}$ (METGLAS® 2826MB). Various techniques have been suggested for enhancing the response of strain sensors using magnetostrictive alloys. For example, Japanese Patent Application Number JP 61240132 entitled "Sensor Detection Method" addresses the issue of enhancing the reproducibility, sensitivity and stability in detecting the inductance value of a sensor constituted of an amorphous alloy having magnetostriction, by repeatedly using an AC signal having constant voltage continuously changing from low frequency to high frequency wherein the electric current applied is an alternating current superposed with a cyclically recurring rectangular current which has, in each cycle thereof, a large amplitude at a start-up point and which converges to a smaller amplitude after a predetermined time period. This and other techniques aim to get improved sensitivity and reliability, or, on other words, a large signal to noise ratio.

There is still a need for cheap, reliable, highly sensitive strain gauges and methods of measuring strain and the present invention addresses these needs.

SUMMARY OF THE INVENTION

It is an aim of some embodiments of the invention to provide a strain sensor and method of detecting strain having enhanced sensitivity.

A first aspect of the invention is directed to providing a strain gauge comprising:
a system comprising a transmission coil, a magnetostrictive material layer and a receiver coil wherein an alternating transmission signal is applied across the transmission coil and an induced signal is induced in the receiver coil; the intensity of the detected signal across the receiver coil being a measurement of strain, wherein frequency of the transmission signal is near to a resonance frequency of the system.

Typically, the magnetostrictive material is sandwiched between the transmission coil and the receiver coil.

Optionally, the strain gauge is embedded in a structural component for measuring strain in the structural component.

Alternatively the strain gauge is retrofitted to a structural component by being adhered thereto.

In one application, for monitoring strain in a substructure comprising a dielectric material, the dielectric material is sandwiched between the transmission coil and the receiver coil.

Optionally, the dielectric material comprises a multi-layer structure and the magnetostrictive material layer is adhered to the dielectric material.

Optionally, the substructure comprises a multi-layer structure and the magnetostrictive material layer is built into the substructure.

Alternatively, the substructure comprises a composite material, the magnetostrictive material layer is built into the substructure and monitoring of stress comprises bringing the transmission coil and the receiver coil into proximity with the substructure.

Optionally, the transmission coil and the receiver coil are brought into proximity with the substructure on opposite sides thereof, sandwiching the substructure and magnetostrictive material layer between the transmission coil and the receiver coil.

Optionally, the strain gauge is used for monitoring strain in a substructure and the strain gauge is adhered to the substructure such that strain in the structure causes strain in the magnetostrictive material layer.

In a second aspect, there is provided a structural member including a magnetostrictive material layer at a preferred location thereof for facilitating the monitoring of strain by coupling a transmission coil and a receiver coil thereto, applying a signal to the transmission coil at a resonance frequency of the magnetostrictive material and monitoring the signal across the receiver coil.

In some embodiments, the structure is part of a vehicle, optionally selected from the list of aircraft, cars and ships.

In other embodiments, the structure is part of a stationary structure, such as a bridge or building for example.

Optionally, the magnetostrictive material layer is integral with the structure. Alternatively, the magnetostrictive material layer is retrofitted thereto.

In a third aspect, the invention is directed to providing a method of monitoring strain at a location in a structure comprising the steps of:
associating a magnetostrictive material layer to the structure;
bringing a transmission coil into proximity with the structure;
bringing a receiver coil into proximity with the structure;
applying an electrical signal across the transmission coil at a set frequency and
monitoring the signal across the receiver coil.

A fourth aspect of the invention is directed to a method of monitoring strain at a location in a structure comprising the steps of:
associating a magnetostrictive material layer to the structure;
bringing a transmission coil into proximity with the structure;
bringing a receiver coil into proximity with the structure;
applying an electrical signal across the transmission coil over a range of frequencies, and
monitoring the frequency corresponding to a minimum detected signal across the receiver coil.

Optionally, the magnetostrictive material layer is sandwiched between the transmission coil and the receiver coil and the magnetostrictive material layer is adhered to the structure at the location.

Alternatively, the magnetostrictive material layer is integral to the structure at the location.

BRIEF DESCRIPTION OF THE FIGURES

For a better understanding of the invention and to show how it may be carried into effect, reference will now be made, purely by way of example, to the accompanying drawings. It is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

It is a specific feature of embodiments of the present invention, that strain sensing means and stress and strain sensors and gauges are disclosed that incorporate a magnetostrictive material layer. When used to measure strain, an alternating current is applied across a transmission coil at or near to the resonance frequency of the system, and a received signal is monitored by a receiver coil. It has been surprisingly found that when the applied signal is at or near to the resonance frequency of the system, the sensitivity of the strain gauge is enhanced dramatically. Consequently, by constructing a two coil strain gauge that includes a layer of magnetostrictive material, a transmission coil and a receiver coil, and then applying an alternating signal to the transmission coil at or near the resonant frequency of the system, a highly sensitive strain gauge may be provided; the resonance phenomena being a function of the transmission function of the system.

There are a number of magnetostrictive materials which may be included within strain sensors that are highly sensitive to strains when subjected to alternating currents at near resonant frequency.

Figure 1:
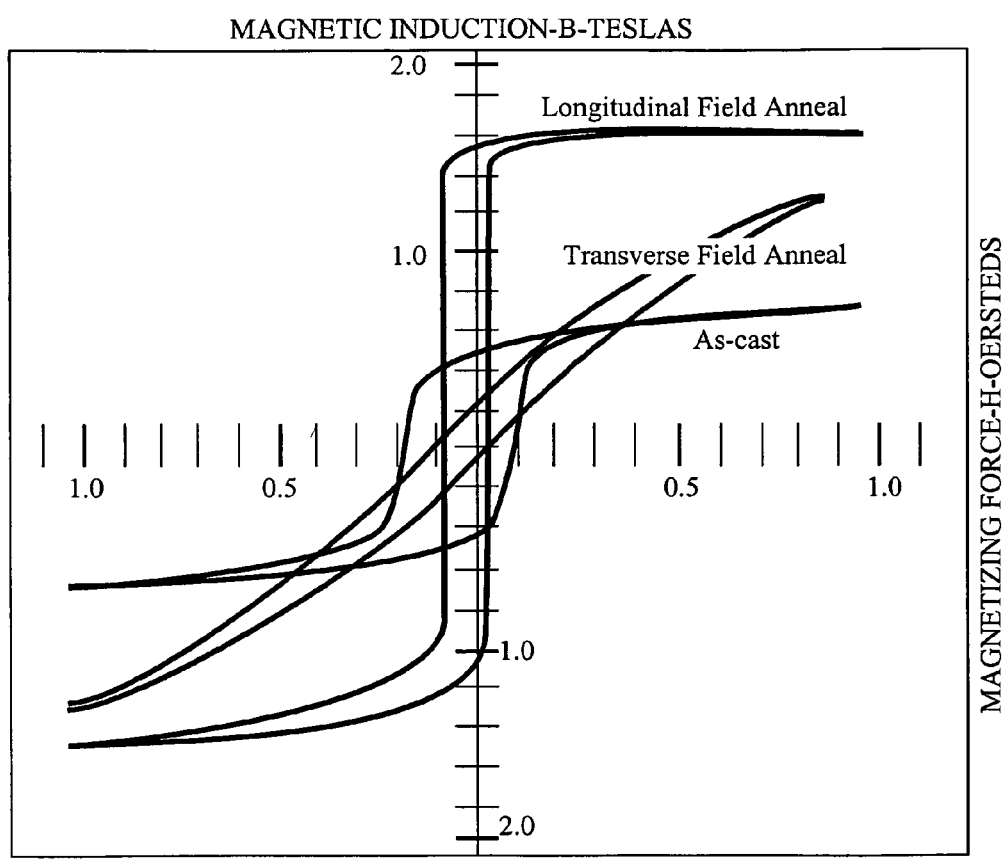
FIG. 1 is a typical DC hysteresis loop of the material Metglas® Alloy 2605SC
Figure 2:
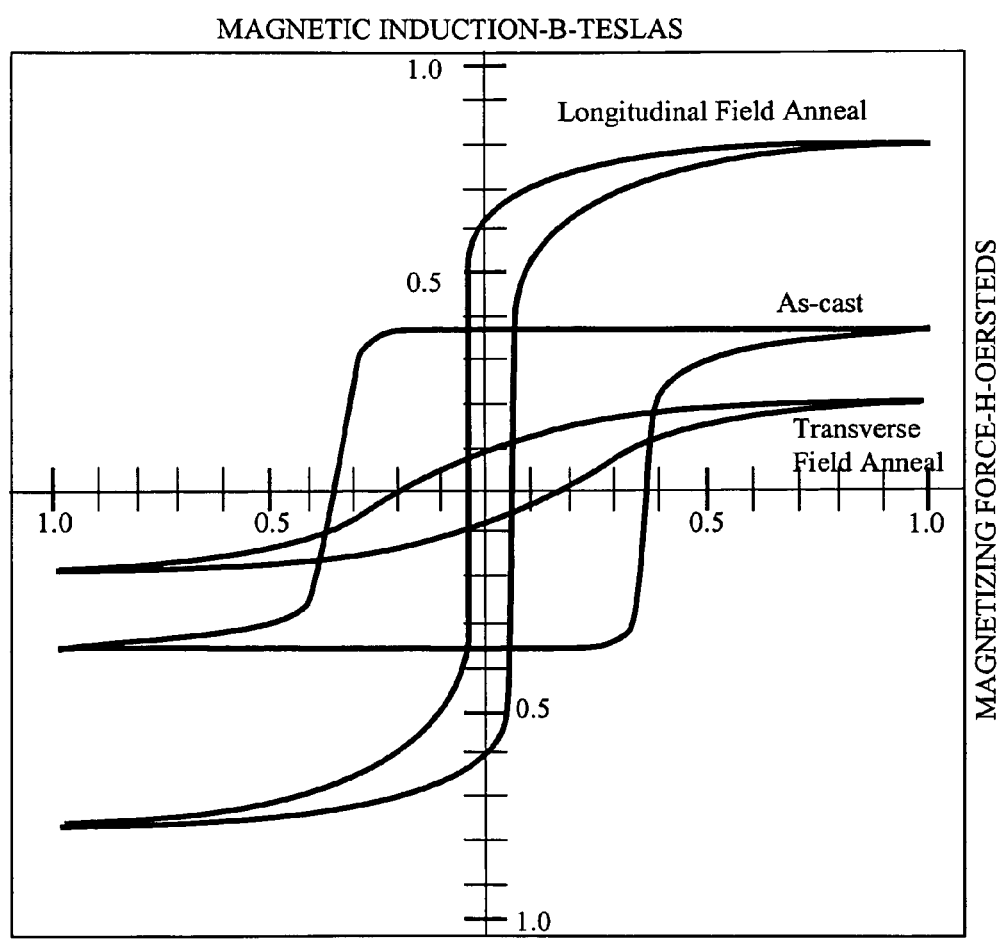
FIG. 2 is a typical DC hysteresis loop of Metglas® Magnetic Alloy 2826MB

Such materials include Metglas Magnetic Alloy 2605SC (Iron-based) which has a composition of $Fe_{81}B_{13.5}S_{3.5}C_2$ and a Saturation Induction of 1.61 Tesla. A typical DC hysteresis loop of the material Metglas® Alloy 2605SC is shown in FIG. 1. Another candidate material is Metglas® Magnetic Alloy 2826MB (Iron Nickel-based) which has a composition of $Fe_{40}Ni_{38}Mo_4B_{18}$ and a Saturation Induction of 0.88 Tesla. A Typical DC Hysteresis Loop of Alloy 2826MB is shown in FIG. 2.

Such materials are available in sheet form and can be embedded within or adhered to structures and used to monitor the stresses and strains applied to or inherent within the structures.

Figure 3A:
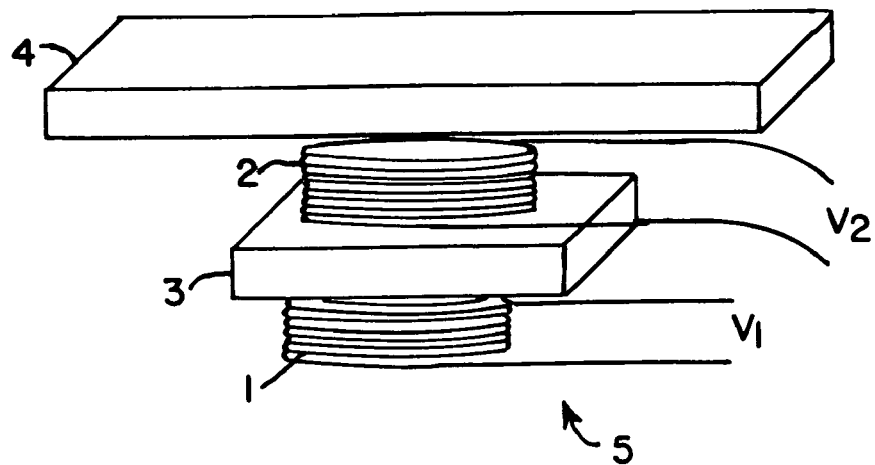
FIGS. 3a, 3b and 3c show exemplary, simplified setups for monitoring strains where a strain gauge consisting of a transmission coil, a magnetostrictive material layer and a receiver coil is coupled to a test piece, such as a structural element.

By way of illustrative example only, one setup of a strain gauge 5 is schematically shown in FIG. 3a. The strain gauge consists of a transmission coil 1, a receiver coil 2 and a magnetostrictive material layer 3, that is coupled to a test piece 4 by being adhered to the test piece 4, so that strain in the test piece 4 causes strain in the magnetostrictive material 3. An alternating signal $V_1$ applied to the transmission coil 1 induces a received signal $V_2$ in the receiver coil 2 and the received signal $V_2$ may be monitored and quantified to monitor the strain in the test piece 4, so long as the magnetostrictive material layer 3 is coupled to the test piece 4 such that strain in the test piece 4 results in a corresponding strain in the magnetostrictive material layer 3.

The test piece 4 may be either metallic or insulating, and may be a composite material, for example, such as widely used in the aerospace industry.

The term 'test piece' is used somewhat loosely to indicate the specimen being tested, which may be a test specimen of a material of interest for materials science research and development or a component or subcomponent of a structure.

It will be appreciated that the coils 2, 3 shown in FIG. 3a are schematic illustrations of coils, and typically, the coils would be flat coils, perhaps printed directly onto the magnetostrictive material layer.

Figure 3B:
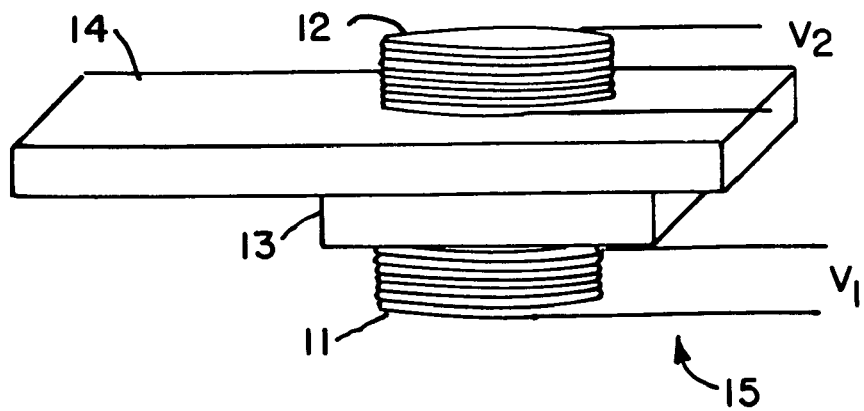

With reference to FIG. 3b, an alternative configuration of a strain gauge 15 is shown, again consisting of a transmission coil 11, a receiver coil 12 and a magnetostrictive material layer 13, mutatis mutandis, however in this case, which is only suitable where the test piece 14 is insulating, such as being a glass fiber-epoxy composite material laminate such as is widely used in aerospace technologies, for example, the magnetostrictive material layer 13 is adhered to the test piece 14 and the receiver coil 12 is attached to the far side of the test piece 14. Since the receiver coil 12 does not interject between the magnetostrictive material layer 13 and the test piece 14, it is easier to obtain good strain transference between the test piece 14 and the magnetostrictive material layer 13 that may be directly adhered to the test piece 14. Another advantage of the setup used in strain gauge 15, is that it will be apparent that the magnetostrictive material layer 13 could be incorporated into a non-conductive component of interest, such as the fiber reinforced skin of an airplane fuselage or wing, and permanently bonded therewith, to be exposed to the same stresses and strains as the component itself. The transmission and receiving coils 11, 12 could then be brought into proximity on either side of fuselage or wing and aligned with each other to monitor the stresses and strains at the point of interest. It will be noted that the transmission and receiving coils 11, 12 will typically be substantially flat, and may be printed by silk-screening a conductive material onto a suitable substrate, perhaps a self adhesive patch or the like. Furthermore, although illustrated as circular coils, it will be appreciated that the shape of the transmission and receiving coils 11, 12 is not limited to any particular geometry and the coils may be shaped and sized to follow the shape of any area or component of interest, including whole sections or components.

Figure 3C:
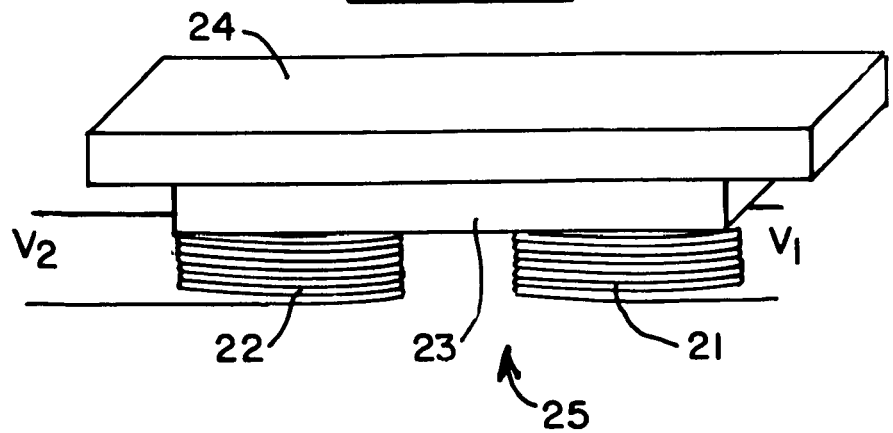

With reference to FIG. 3c, a third configuration is shown, wherein the magnetostrictive material layer 23 is attached to one side of the test piece 24 and the transmission and receiver coils 21, 22 are brought into close proximity with each other, both being on the same, i.e. other side of the magnetostrictive material layer 23. The resultant strain gauge 25 is less effective in that the degree of flux coupling between the transmission coil 21 and the receiver coil 22 will be less and the effective of the changes in strain to the magnetostrictive material layer 23 on the signal detected by the receiver coil 22 will also be less. Nevertheless, the strain gauge 25 thus formed will still work, and could be required where, for example, the magnetostrictive material layer 23 is permanently coupled to the test piece 24, which may be a structural component tested in situ, and the transmission coil 21 and receiver coil 22 might be brought into proximity with the magnetostrictive material layer 23 as a probe, to monitor and follow stresses and strains in specific regions of the component, or to map local stress and strain variations over a large area of a component to identify trouble spots, for example. In general, best results are obtained where the magnetostrictive material layer 3 is sandwiched between the transmission coil 1 and receiver coil 2 as shown in FIG. 3a.

Referring back to FIG. 3b, for monitoring thin dielectric materials such as polymers and composite materials and similar test pieces 4, such as sometimes used in the wings and fuselage of aircraft, for example, the coils 11, 12 can either be arranged around the structure, sandwiching the component to be tested/test piece 14 between the coils 11, 12. In this manner, one or both coils 11, 12 can be brought into proximity with the test piece 14 as a test probe; the magnetostrictive material 13 being adhered to the test piece 14, perhaps permanently stuck thereto, on an inner surface thereof. Alternatively, as shown in FIG. 3c, a strain gauge 25 consisting of the transmission coil 21, receiver coil 22 and magnetostrictive material layer 23 may be adhered to the test piece 24, which may be part of a substructure to be tested.

For monitoring stresses in stationary structures such as bridges, and for monitoring stresses in metal structures, such as parts of cars or boats, the strain gauge 5, 15 comprising transmission coils 1, 11 and receiver coils 2, 12 and the magnetostrictive material layer 3, 13 is typically retrofitted to existing structures by being adhered thereto. It may be built into the structure to be tested however.

Strictly speaking, only the magnetostrictive material layer 3 need be physically coupled to the test piece. The transmission and receiver coils 1, 2 may be brought into proximity therewith. For example, with a composite material test piece, such as a glass-epoxy composite as widely used in the aerospace industry, the magnetostrictive layer may be adhered to one side of the material or even built into the multilayer structure thereof, and the coils may be brought into proximity with the test piece 4, preferably on either side thereof, the test piece 4 itself being a thin dielectric material.

It will be appreciated that permanently mounted sensors 5, 15 within a structure such as an airplane, for example, enables real time health monitoring, and thus the downtime of airplanes for testing fatigue and aging effects is minimized. Furthermore, the stresses and strains resulting from flying in inclement weather conditions, from overloading, engine failure and other causes can be monitored during flight. This may provide data to the so-called black-box for subsequent analysis and may be linked to a processor for analysis during the flight in real time, to provide warning to the crew, that something is amiss, to cause the pilot to lower his altitude or speed, or perhaps to make for the nearest airport. It will be noted that permanently embedded magnetostrictive type sensors give accurate measurement of local stress, with the coupling leads not substantially contributing to the signal attenuation. This makes magnetostrictive sensors 5, 15 particularly appropriate for embedding in structures such as aircraft wings and the like.

Figure 4:
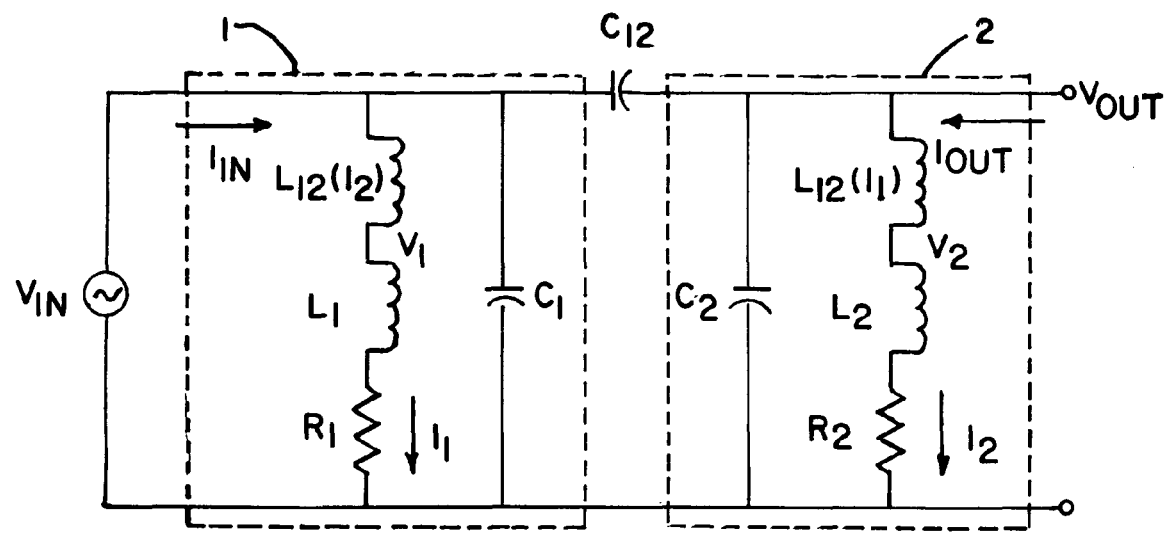
FIG. 4 is an equivalent circuit diagram for the strain gauge of FIG. 3.

With reference now to FIG. 4, a simplified, generalized lumped equivalent circuit diagram of stress/strain gauges in accordance with the schematic setups shown in FIGS. 3a, 3b and 3c is presented. In FIG. 4, $L_1$ is the self inductance of the transmission coil 1, $R_1$ is the resistance of transmission coil 1, $C_1$ is the effective capacitance of transmission coil 1. $L_{12}$ is the mutual inductance between the transmission coil 1 and receiver coil 2, $C_{12}$ is the effective capacitance between the transmission coil 1 and receiver coil 2.

Similarly, $L_2$ is the self inductance of the receiver coil 2, $R_2$ is the resistance of the receiver coil 2. $C_2$ is the effective capacitance of the receiver coil 2.

Furthermore:
f is the operating frequency
ω is the radian frequency, ω=2πf
$V_{in}$ is the source voltage at frequency f It will be appreciated that the self $L_1$, $L_2$ and mutual inductances $L_{12}$ depend on the level of stress of the magnetostrictive material layer.

The sum of currents at the node corresponding to $V_1$ is zero (Kirchoff's law), so:

$$I_{in} = \frac{V_1}{R_1 + j\omega L_1} + j\omega C_1 \cdot V_{in} + j\omega C_{12} \cdot (V_{in} - V_{out}) \quad (1)$$

$$I_{out} = \frac{V_2}{R_2 + j\omega L_2} + j\omega C_2 \cdot V_{out} - j\omega C_{12} \cdot (V_{in} - V_{out}) \quad (2)$$

The effect of mutual inductances is included by $$V_{in} - V_1 = j\omega L_{12} \frac{V_2}{R_2 + j\omega L_2} \quad (3)$$

$$V_{out} - V_2 = j\omega L_{12} \frac{V_1}{R_1 + j\omega L_1} \quad (4)$$

By manipulation of Equations 1 to 4, the z-parameters may be given in the form:

$$\left\{ \begin{array}{c} V_{in} \\ V_{out} \end{array} \right\} = \left[ \begin{array}{cc} z_{11} & z_{12} \\ z_{21} & z_{22} \end{array} \right] \left\{ \begin{array}{c} I_{in} \\ I_{out} \end{array} \right\} \quad (5)$$

The s-parameters of the circuit may be found from the z-parameters as follows:

$$\left[ \begin{array}{cc} s_{11} & s_{12} \\ s_{21} & s_{22} \end{array} \right] = \left[ \begin{array}{cc} 1 & 0 \\ 0 & 1 \end{array} \right] - 2 \cdot \left( \left[ \begin{array}{cc} 1 & 0 \\ 0 & 1 \end{array} \right] + \frac{1}{Z_0} \left[ \begin{array}{cc} z_{11} & z_{12} \\ z_{21} & z_{22} \end{array} \right] \right)^{-1} \quad (6)$$

where $Z_0$ is the characteristic impedance of the measurement system transmission lines; typically about 50 Ohms.

The s-parameter of interest is the transfer function, $s_{21}$. Examination of $s_{21}$ shows that the system has a resonant frequency that depends, inter alia, on the self $L_1$, $L_2$ and mutual inductances $L_{12}$ of the coils 1, 2.

Figure 5:
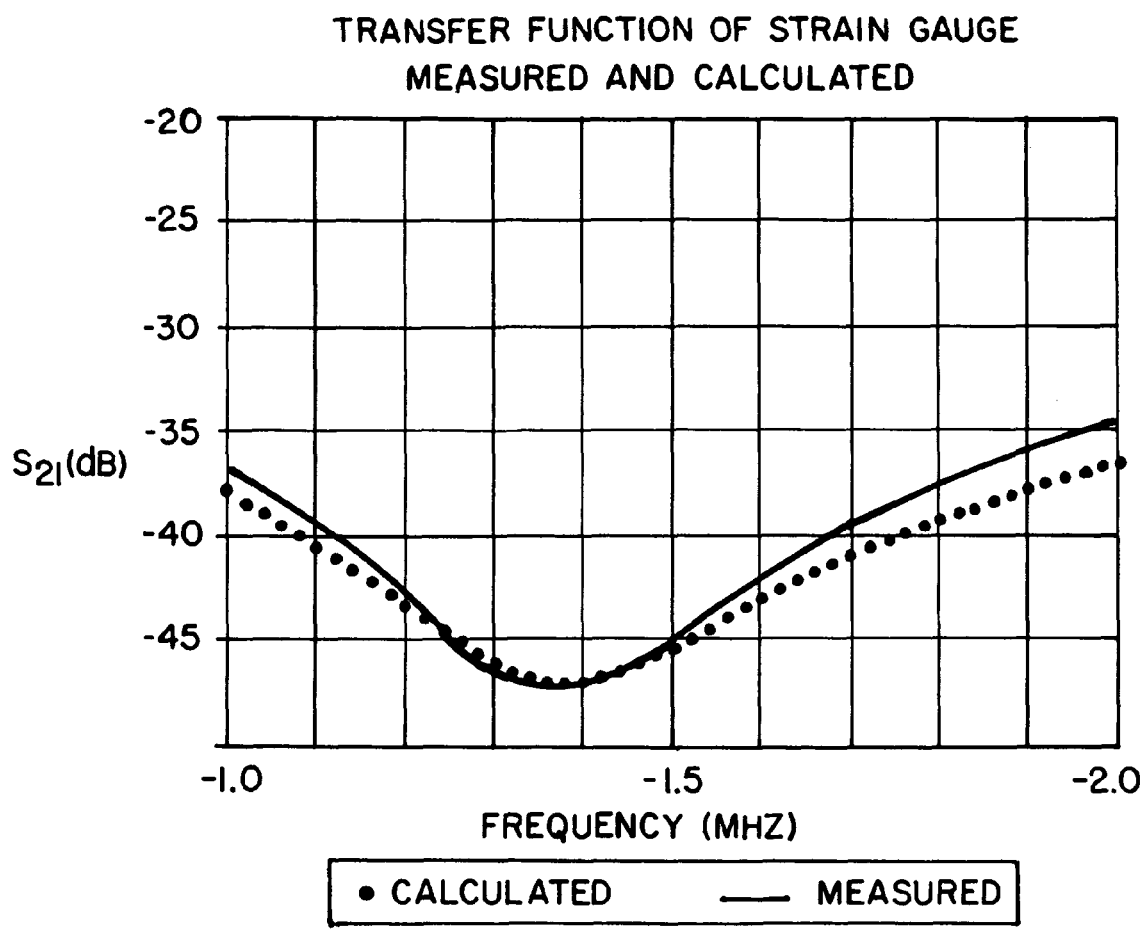
FIG. 5 is a frequency intensity of signal graph showing actual and theoretical transfer functions for a strain gauge constructed in accordance with FIG. 4 (that shown in FIG. 7)
Figure 7:
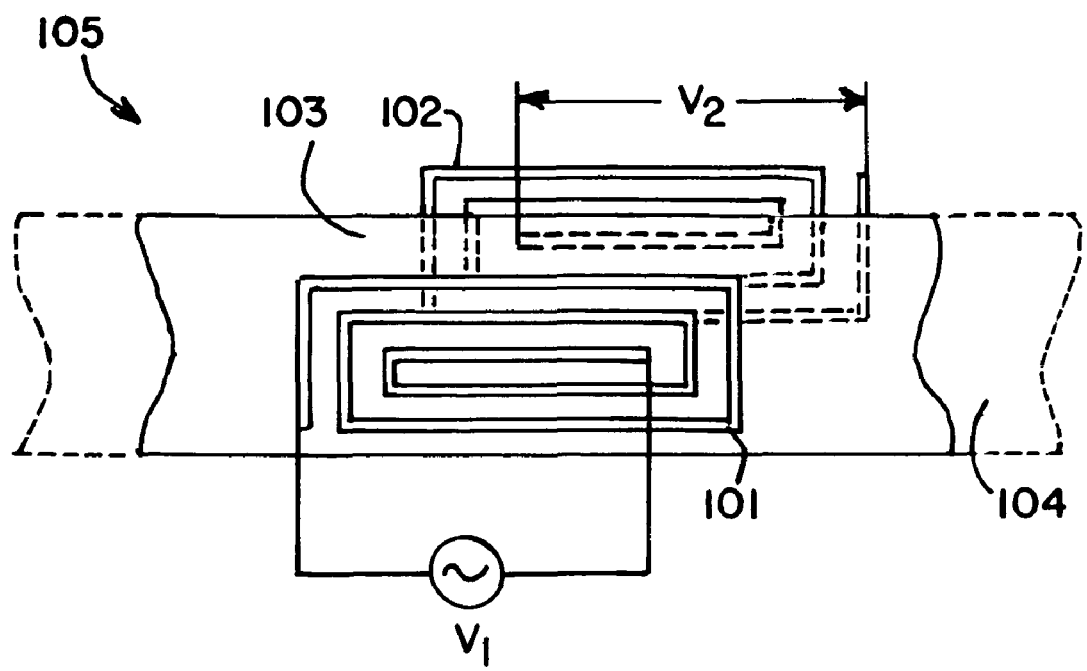
FIG. 7 shows an exemplary sensor comprising a sheet of METGLAS® 2826MB amorphous alloy sandwiched between a pair of 40 loop rectangular coils of size 90 m×45 mm.

With reference to FIG. 5, an example of the behavior of the transfer function of the strain gauge of FIG. 3a and FIG. 7, in the vicinity of the resonant frequency is shown.

The self $L_1$, $L_2$ and mutual inductances $L_{12}$ are functions of the relative permeability of the magnetostrictive material layer 3, which in turn depends on the stress applied thereto. The good correlation between the measured and the calculated values provides empirical support for the theory discussed hereinabove with reference to the equivalent circuit of FIG. 4. It will be noted that the correct choice of the operating frequency with respect to the resonant frequency increases the sensitivity of the strain gauge 5 and is the key to its successful implementation.

Figure 6:
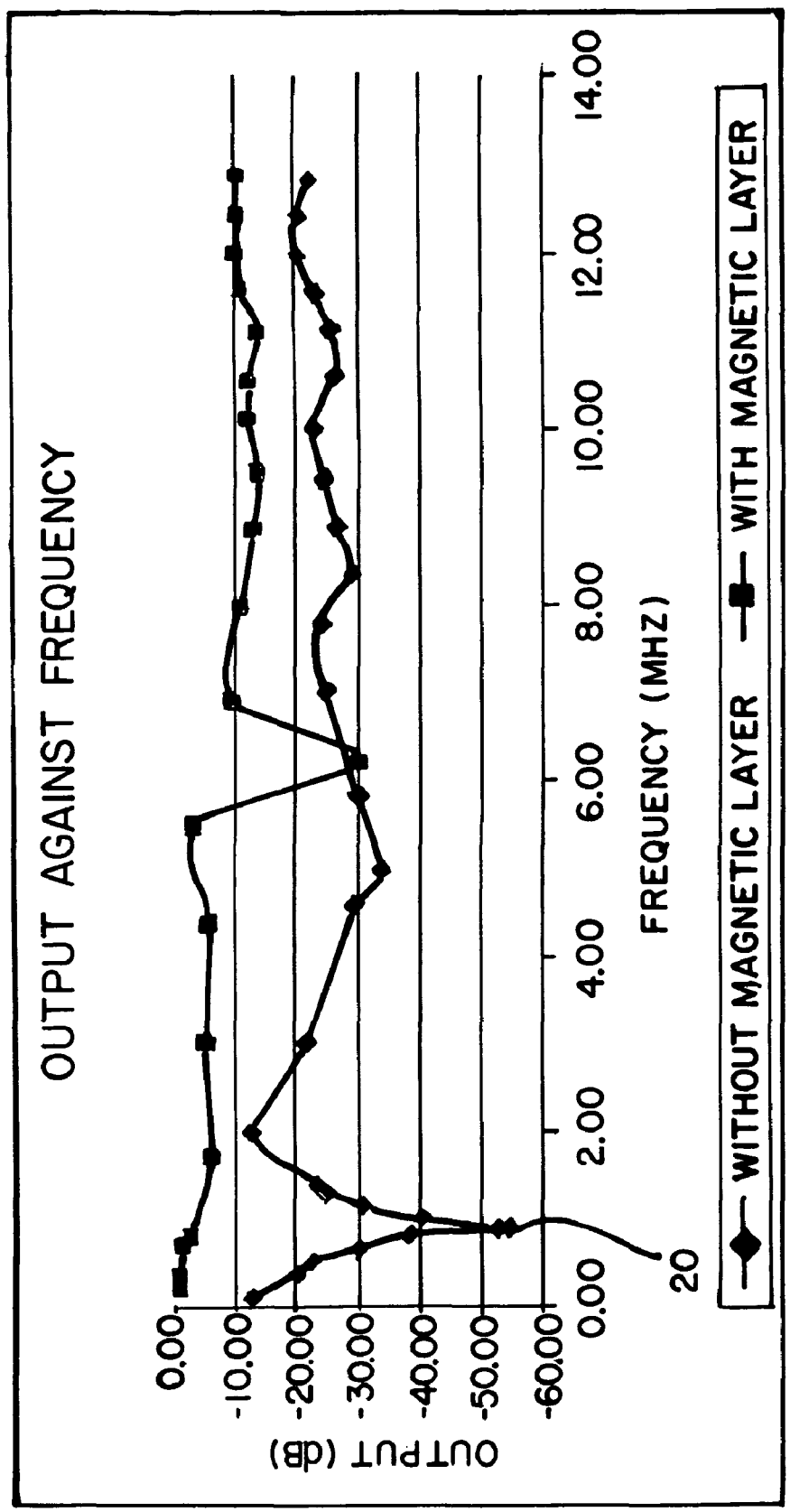
FIG. 6 is an output vs. frequency plot showing how incorporation of a Metglas® magnetostrictive material layer within a strain gauge causes a smaller output but greater signal variation at a frequency of 1 MHz, the frequency being the resonance frequency of the system, and is a function of the geometry and materials.

With reference to FIG. 6, an output vs. frequency plot for a Metglas® 2605SC magnetostrictive material layer incorporated within the strain gauge 5 (FIG. 3a) is shown, as is a similar plot without the magnetostrictive material layer. As is clearly shown by the plot, due to the presence of the magnetostrictive material layer 3, the detected signal 20 received by the receiver coil 2 is very much weaker than where the magnetostrictive material 3 is not provided. This is to be expected, since the magnetostrictive material has a damping effect. It has been surprisingly found that the strain gauge 5 demonstrates a vastly increased sensitivity at a frequency of about 1 MHz, which is the resonant frequency of the system.

Referring to FIG. 7, an exemplary strain gauge 105 is shown. Exemplary strain gauge 105 comprises a magnetostrictive material layer 103 consisting of a sheet of MET-GLAS® 2826MB amorphous alloy sandwiched between a pair of very thin and flexible transmission and receiver coils 101, 102, fabricated by printed circuit technology. The transmission and receiver coils 101, 102 were 40 loop flat rectangular shaped coils of external size 90 m×45 mm.

Figure 8:
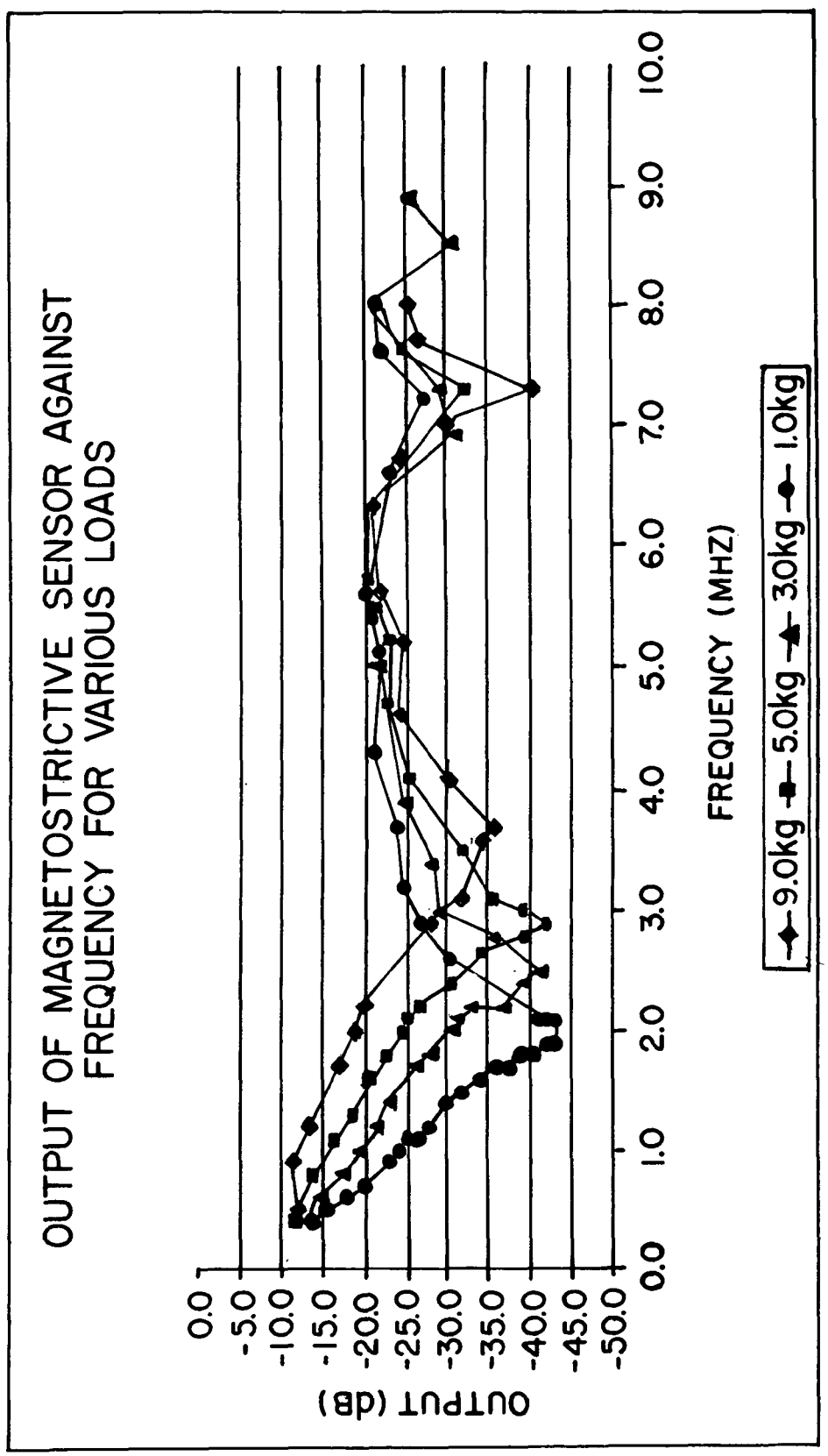
FIG. 8 is a graph showing the signal intensities for the sensor of FIG. 7 under different direct loadings and frequencies.

In FIG. 8, the signal intensities measured across the receiver coil 102 is given for different loadings to the magnetostrictive material layer 103 and frequencies applied across the transmission coil 101. The loadings were applied directly to a 50 mm wide strip of the magnetostrictive material. It will be noted that for low frequencies of between 1 MHz and 2 MHz, the variation in detected signal intensity across receiver coil 102 varies over 400% as the applied load on the strain gauge 105 varies from 1 kg to 9 Kg, see FIG. 8. This sensitivity is far superior to that previously obtained with magnetostrictive strain gauges. In one embodiment, therefore, the signal across the receiver coil 102 is monitored at a set frequency.

It will also be noted that for each strain, there is a minimum response signal at a set frequency that varies continuously with the strain. The minimum detected signal across receiver coil 102 for the non-loaded strain gauge 105 was around 1.9 MHz; for a load of 1 Kg, the minimum signal was around 2 MHz; for a load of 3 Kg, the minimum signal was around 2.5 MHz; for 5 Kg the minimum signal was around 3 MHz and for 9 Kg, the minimum signal was around 3.8 MHz. Thus it is shown that the minima in the detected signal varies with applied load and in a second embodiment, the minimum response signal across the receiver coil 102 is used as a measure of applied load in stress gauges, or of strain in strain gauges.

Figure 9:
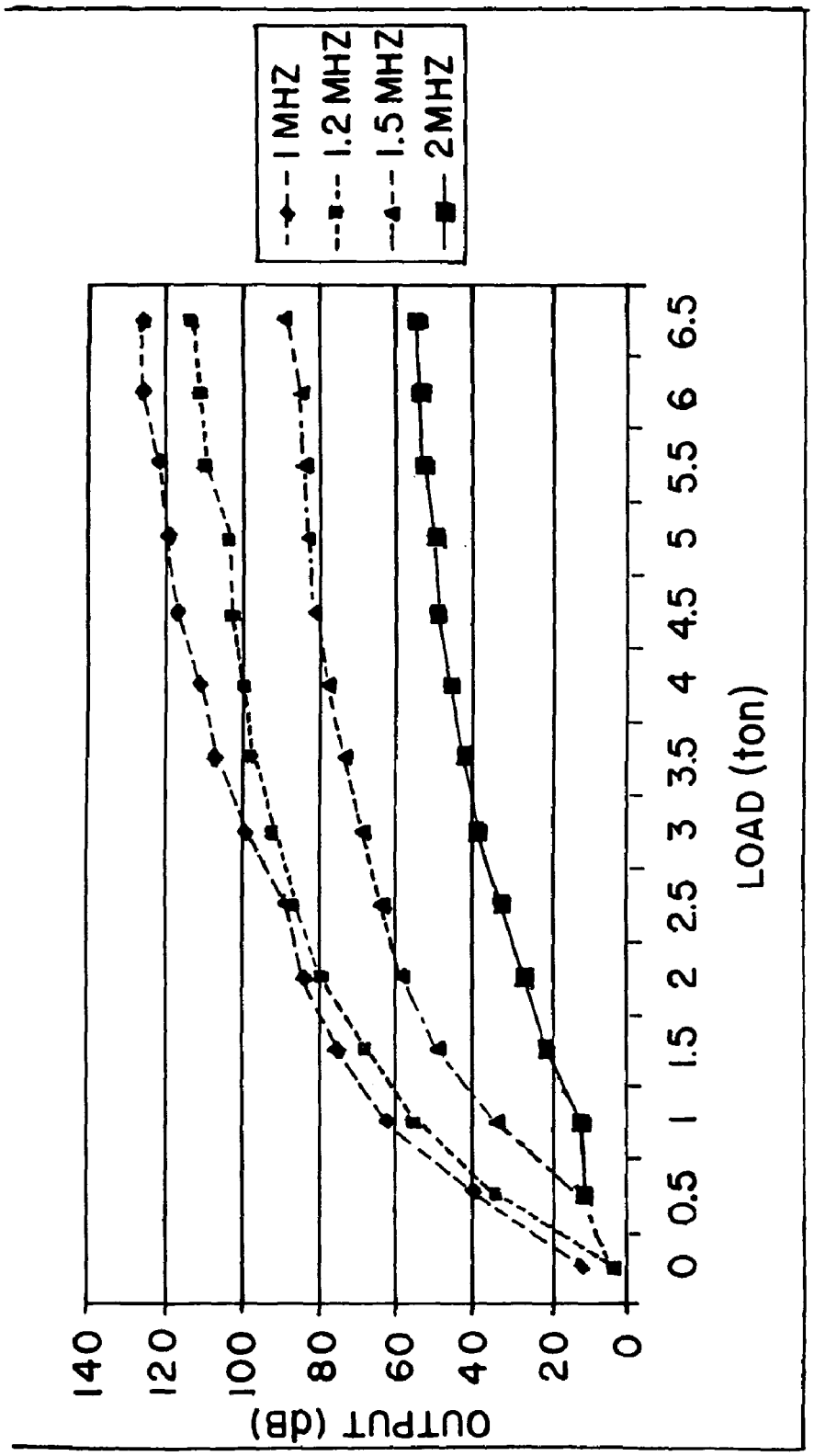
FIG. 9 is a series of load vs. induced signals for the strain gauge of FIG. 6 coupled to a glass fiber-epoxy matrix) composite test specimen (Instron® dog-bone shaped test sample); wherein the test specimen was loaded in tension and alternating currents of various frequencies were supplied to the transmission coil and the resulting signals detected by the receiver coil were monitored.

FIG. 9 is a graphical representation of several series of load vs. induced signals for the strain gauge of FIG. 7 attached to an Instron® tensile test specimen (4 mm×50 mm×210 mm) consisting of graphite fibers in an epoxy resin. The test piece was loaded with forces of up to several tons, and at each applied load, the transmission coil 101 of the strain gauge 105 was subjected to a transmission signal $V_1$ consisting of alternating currents at various frequencies, and the signal received $V_2$ at the receiver coil 102 was monitored. It was demonstrated that there is a continuous variation in signal with load where the larger the applied load, the larger the signal. Additionally, a peak sensitivity was noted at frequencies of 1 MHz which was determined to be the resonance frequency of the system.

Thus a sensor is presented, which can be used to measure applied loads or stress. What is actually being monitored, of course, is strain in the magnetostrictive material layer 103; however this is a measure of strain in the test piece to which the strain gauge 105 is coupled and the strain is related to the applied stress. Consequently, essentially the same construction can be used for fabricating stress or strain gauges. The continuous change in signal intensity with applied load and the reproducibility of the results enables stress gauges and strain gauges to be constructed, and such gauges to be calibrated. It will be noted that the most intense signals were obtained where an alternating frequency at the resonance frequency (1 MHz) was applied to the transmission coil; this implies that such gauges will be at their most sensitive at this frequency. It will be appreciated however, that the resonance frequency is a function of the system geometry and not just of the type and thickness of the magnetostrictive material.

Figure 10:
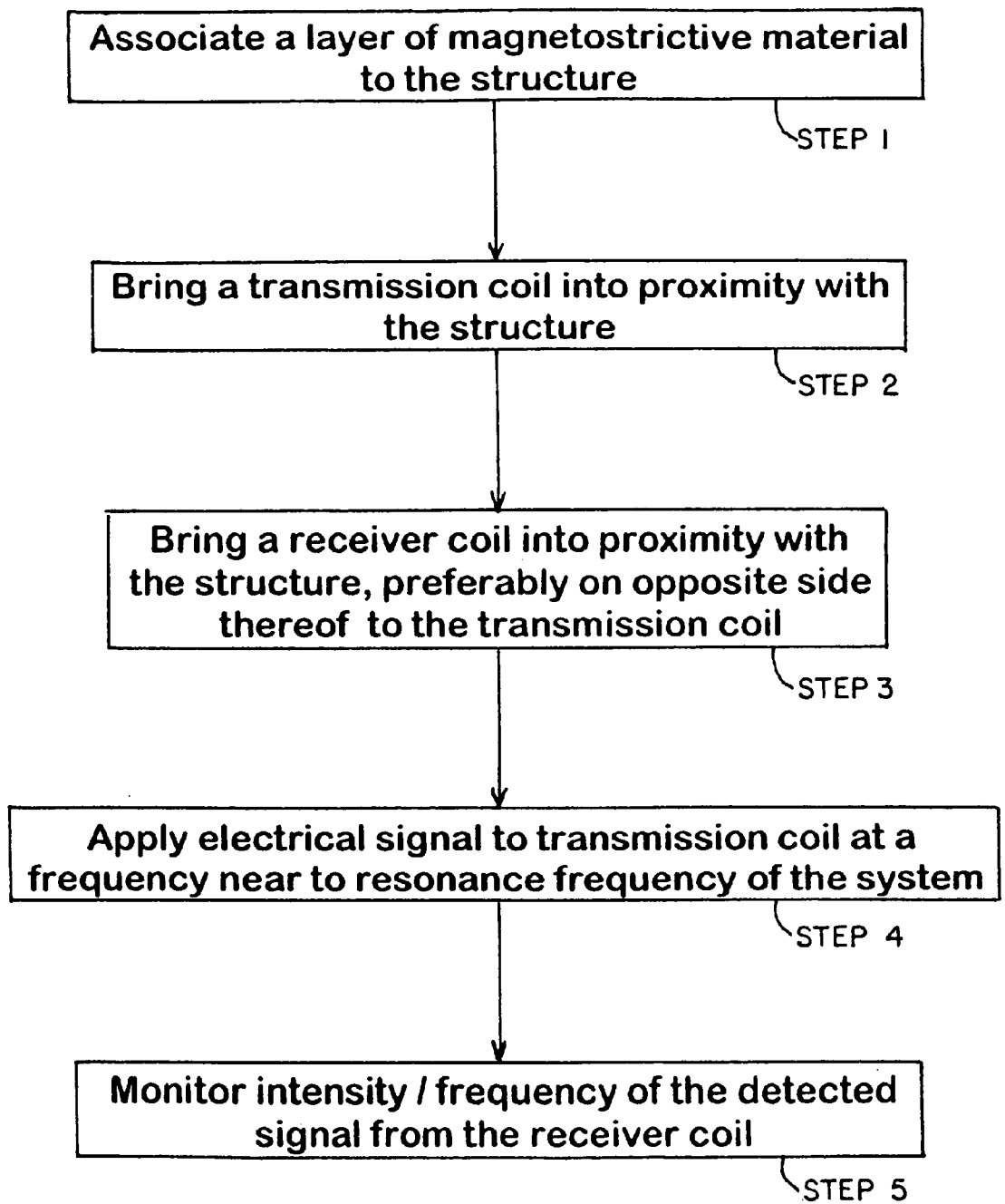
FIG. 10 is a flowchart giving the steps of a generalized method of the invention.

With reference to FIG. 10, a generalized method of monitoring strain in a structure comprises the steps of: associating a magnetostrictive material layer to the structure—step 1; bringing a transmission coil into proximity with the structure—step 2;

bringing a receiver coil into proximity with the structure—step 3, thereby providing a system comprising the transmission and receiver coils and the magnetostrictive material layer; applying an electrical signal to the transmission coil at a frequency near to resonance frequency of the system—step 4, and monitoring the signal from the receiver coil—step 5.

As explained hereinabove, the response for the probe for a set frequency and input signal may be monitored, or the frequency corresponding to a minimum response may be monitored.

In one embodiment, pieces of magnetostrictive sheet are built into structures. For example, the magnetostrictive material and one or both transmission and receiver coils may be incorporated as a layer within a laminar composite structure, such as part of the fuselage, wings or aelerons of an aeroplane, for example. Where neither or only one coil is permanently attached to the magnetostrictive material, a probe comprising the non-attached coil(s) can be brought into proximity with the structure, near where the piece of magnetostrictive material is embedded or adhered. The strain in the magnetostrictive material is easily and accurately monitored by applying a signal at the resonant frequency.

Embedded or adhered magnetostrictive sheet can be used for a wide range of applications, including vehicles such as boats, bridges, cars and aeroplanes, or stationary structures such as bridges and buildings, for example. It can also be used within load sensors for car seats, for airbags and the like.

A probe including both transmission and receiver coils may be brought into proximity with the magnetostrictive material incorporated or adhered to the structure to be tested. The intensity of the signal induced in the secondary coil varies over an order of magnitude where the signal applied to the transmission coil is at or near the resonant frequency of the system.

The transmission and receiver coils may be pattern-printed onto the surface of the magnetostrictive material Alternatively, either or both the transmitter coil and the receiver coil may be wound from wire. Although magnetostrictive Metglas® and similar materials are available in sheet form, it is possible that in some embodiments the magnetostrictive material is painted onto the structure to be tested and the transmission and/or receiver coils are attached thereto.

Other magnetostrictive materials may be utilized as above and coupled to a transmitter coil to which a signal at or near to the system-specific resonant frequency is applied to give a signal for detecting by a secondary coil that is particularly sensitive to strain. By 'near to the resonant frequency' within a half peak width from the minimum resonant frequency is generally intended. For example, glassy alloys may be used, such as those having compositions of $Co_aFe_bNi_cM_dB_eSi_f$ where M is at least one member selected from the group consisting of Cr, Mo, Mn and Nb, and "a-f" are in atom percent where "a" ranges from about 66 to 71, "b" ranges from about 2.5 to 4.5, "c" ranges from about 0 to 3, "d" ranges from about 0 to 2 except when M=Mn in which case "d"

ranges from about 0 to 4, "e" ranges from about 6 to 24 and "f" ranges from about 0 to 19, with the proviso that the sum of "a", "b" and "c" ranges from about 72 to 76 and the sum of "e" and "f" ranges from about 25 to 27. Iron-boron-silicon-carbon metallic glass of the formula $Fe_wB_xSi_yC_z$ wherein $0.78 \leq w \leq 0.83$, $0.13 \leq x \leq 0.17$, $0.03 \leq y \leq 0.07$, $0.005 \leq z \leq 0.03$ and $w+x+y+z=1$ may be used. Other recipes include Co 85% Zr 10% Fe 5%, amorphous iron-phosphorus alloys containing 8-23 atomic % phosphorus, deposited as thin films by plating techniques. cobalt-iron alloy magneto-elastic film having from about 20 to about 40 atomic weight iron, Co 85% Zr 10% Fe 5%. Likewise Nickel-Iron alloys comprising 50-70% nickel and 30-50% iron and magnetostrictive materials are also suitable, including, but not limited to, nickel, iron, rare earth-iron alloys, such as Terfenol-D for example, and other magnetic material that exhibit an appreciable magnetostrictive coefficient may be used at their resonant frequencies to give added sensitivity.

Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method of monitoring strain at a designated location in a composite substructure comprising a solid dielectric material, comprising the steps of:
    fixing a magnetostrictive material layer to the composite substructure;
    bringing a transmission coil into proximity with the magnetostrictive material;
    bringing a receiver coil into proximity with the magnetostrictive material;
    applying an electrical signal across the transmission coil over a range of frequencies; and
    monitoring a frequency near a resonant frequency and having a near minimum detected signal strength across the receiver coil to determine changes in strain of the composite substructure.

2. The method of claim 1, wherein the magnetostrictive material is sandwiched between the transmission coil and the receiver coil.

3. The method of claim 1, wherein said composite substructure comprises said solid dielectric at said location, and at least one of a group consisting of the transmission coil, receiver coil and magnetostrictive material layer are embedded in the composite substructure for measuring the strain of the structural component.

* * * * *